United States Patent [19]

Willcox

[11] Patent Number: 4,629,302

[45] Date of Patent: Dec. 16, 1986

[54] CAMERA WITH FOCAL PLANE SHUTTER APPARATUS

[76] Inventor: Frederick P. Willcox, 565 Oenoke Ridge, New Canaan, Conn. 06840

[21] Appl. No.: 761,901

[22] Filed: Aug. 2, 1985

Related U.S. Application Data

[63] Continuation of Ser. No. 438,815, Nov. 3, 1982, abandoned.

[51] Int. Cl.[4] .............................................. G03B 9/28
[52] U.S. Cl. ................................................... 354/242
[58] Field of Search ................. 354/241, 242, 243, 245

[56] References Cited

U.S. PATENT DOCUMENTS

| | | | |
|---|---|---|---|
| 2,512,815 | 6/1950 | Svensson | 95/57 |
| 2,691,331 | 10/1954 | Willcox | 354/253 |
| 2,803,181 | 8/1957 | Willcox | 95/63 |
| 3,491,673 | 1/1970 | Forys | 354/243 |
| 3,511,158 | 5/1970 | Nerwin | 95/57 |
| 3,646,603 | 2/1972 | Wolfgang et al. | 354/242 |
| 3,739,704 | 6/1973 | Akiyama | 354/243 |
| 3,744,392 | 7/1973 | Dahlgren et al. | 95/57 |
| 4,109,265 | 8/1978 | Hashimoto | 354/244 |

FOREIGN PATENT DOCUMENTS 561859 10/1932 Fed. Rep. of Germany .
880908 10/1961 United Kingdom .

OTHER PUBLICATIONS

Morrison, R. A., "Rolling Surface Mechanisms", *Machine Design*, (Dec. 11, 1958), pp. 119–123.

Hain, K., "How to Design Rocking Mechanisms", *Product Engineering*, (Sep. 18, 1961), pp. 65–70.
One copy photo of the Fairchild Rapidyne 3-½ inch Rapidyne Shutter as referenced in the application, including six photos of the type of stopping mechanism as used in the above Fairchild shutter.

*Primary Examiner*—Donald A. Griffin
*Attorney, Agent, or Firm*—William D. Hall

[57] ABSTRACT

A focal plane shutter apparatus having two single flexible shutter blades for respectively uncovering and then covering an exposure aperture to make an exposure are incorporated into a 35 mm camera. Each shutter blade has a driven end and an opposite free end with both free ends sliding in the same guide channels across the exposure aperture. Each of the shutter blades has its driven end retained by a special rotary structure. Each rotary structure is acted upon by an adjustable acceleration spring and by a weak carry-through spring. Each shutter blade and its respective rotary driving structure are smoothly and quietly stopped by respective pairs of rocking cams which coact during shutter blade overtravel. The rocking cam structures used for stopping may be reset by another respective pair of rocking cams which coact during almost all of a shutter rewind sequence. The kinetic energy transferred through each stopping pair of rocking cams is dissipated by friction or in winding a spring, or a combination of both. A special winding mechanism provides low winding forces and capping of the shutter blades during rewind.

43 Claims, 20 Drawing Figures

CAMERA WITH FOCAL PLANE SHUTTER APPARATUS

This is a continuation of U.S. patent application Ser. No. 438,815 filed Nov. 3, 1982, now abandoned.

BACKGROUND OF THE INVENTION

1. Field of the invention.

This invention pertains to focal plane shutters having two single blades and the guiding, driving, stopping, and rewinding structures and mechanisms therefor, as well as the supporting camera body structure.

2. Discussion of the prior art.

Apart from the prior art pertaining to focal plane shutters of the kind having oppositely moving blades and the kind having blades which move in a straight line and in the same direction to make an exposure, two groups of patents are of specific interest. The first group pertain to stopping high speed shutter mechanisms, and the second group have to do mostly with the shutter blades themselves.

My U.S. Pat. No. 2,691,331 Oct. 1954, and a division thereof, U.S. Pat. No. 2,803,181 Aug. 1957, pertain to an interlens shutter having two sets of blades and in which the primary shutter driving structures are each brought to a smooth stop by a driven cam and a sliding follower unitary structure which includes a second sliding follower which coacts with the back of the driven cam during rewind thereof to effect follower reset. The energy is dissipated in sliding friction against a spring loaded brake member.

German Pat. No. 561,859 to Zeiss, Oct. 1932, and U.S. Pat. No. 3,511,158, to Nerwin, May 1970, both show shutter curtains of the metal jalousie type which are stored in semi-circular channels partially surrounding the film spools. The curtains are driven by geared sprockets which engage the jalousie bars of the curtains. Jalousie curtains are generally heavy and expensive to manufacture, as well as being somewhat noisy.

Another invention in this second group is U.S. Pat. No. 3,646,603 to Ort et al, Feb. 1972, is simplified over the Zeiss and Nerwin patents in having each curtain made of a single piece of thin metal, which are stored in reverse curved channels. These blades have required transverse stiffening corrugations along the bendable length of each blade as well as stiffening bars at both ends of each blade. The required transverse corrugations are undesirable for blades which must operate at high curtain velocities, i.e., over two hundred inches a second. This is particularly so with the closing blade which is pushed around the curves in the guide channels as well as in the straight channel portion. With very thin metal blades confined in channels this pushing force loads the blade as though it were a column. The transverse corrugations require the guide channels to be sufficiently wide to accommodate the wave height of the corrugations, hence the channels are much too wide for the plain portions of the blades. As a consequence, during the pushing, the blades tend to exhibit columnar buckling and hence bind in the channels during application of the driving force.

It also seems obvious that Ort et al did not comtemplate a high speed shutter because of the inherently flexible blade driving member and its flexible coupling to the driven end of the blade. The driving members have two right angle bends and a necked down portion at the first bend from the drive shaft. Hence the application of any force sufficient to drive the blade at high speed would cause bending of the member and thus a spring coupling dissipating part of the driving force.

Prior to the issuance of my U.S. Pat. No. 2,691,331 a production version of that shutter was produced which had a three and one-half inch aperture. In this large version, which had a shortest total time of one three-hundredth of a second and hence extremely high driving forces, the sliding cam-followers of the patent were replaced by a rocking cam pair at each driving member. These rocking cam pairs, which rolled against each other, were circularly configured and operated through a much larger angle than the present invention. Kinetic energy transferred to each follower cam was dissipated by friction. Each follower cam had a lever portion with a pivoted brake shoe at the end thereof which slid along an arcuate friction surface of a large brake member which, in turn, was located by two limit stops and spring loaded into positive engagement. During braking, there was essentially no winding of the loading spring as is done in this invention. The limit stops and loading spring held the arcuate surface of the brake member at essentially a fixed radius from the axis of the follower cam pivot. The spring biased pivoted brake shoe released during resetting of the follower cam. Each follower cam was reset by a sliding cam and lever arrangement. The use of rocking cams for resetting was not considered. Shutters based upon my U.S. Pat. No. 2,691,331 and the divisions thereof were manufactured by Fairchild Camera & Instrument Corp.

The design of rocking cam pairs, also known as rolling cams, which ideally roll against each other without sliding when one cam is driving the other, (coacting), has been well described in the Dec. 11, 1958 issue of Machine Design magazine and in the Sept. 18, 1961 issue of Product Engineering magazine.

SUMMARY OF THE INVENTION

The purpose of this invention is to provide a focal plane shutter apparatus, particulary for 35 mm cameras, which has very high curtain velocity and is so controlled as to present no image-degrading vibration and to be virtually noise free. These goals and other advantages are obtained by a combination of inter-related improvements over the prior art involving curtain structure and the supporting, guiding, driving, stopping and rewinding thereof. Two single, very thin, flexible metal blades are used as curtains. Each is supported at one end by a drive shaft structure which rotates, in the example shown, through 180° to either push or pull the free end of the blade across the camera exposure aperture. These drive shaft structures or mechanisms are disposed on either side of the camera mirror box, (assuming it is a reflex camera), along with semi-circular channels partly surrounding each drive shaft for storing the respective blades. These semi-circular channels are each contiguous with a straight channel structure which guides both free ends of the blades across the exposure aperture. Each drive shaft mechanism is driven by a bar-like acceleration spring which acts during pre-travel of the respective blade, and also by a relatively weak carry-through spring which maintains the imparted velocity and acts throughout the 180° rotation.

The smooth and quiet stopping of each drive shaft mechanism and respective shutter blade is effected by a pair of rocking cams. The driving cam of each pair is fastened to the respective drive shaft and coacts with the respective follower cam during approximately the last 15° of shaft rotation to accelerate that follower thus arresting rotation of the drive shaft. The follower cam desirably rotates through a larger angle and then overtravels while effecting energy dissipation in a combination of winding a spring and friction braking, or in winding a spring only. In the combination of spring winding and friction braking reset of each follower is accomplished by another pair of rocking cams which coact during shutter rewinding. In the case of energy dissipation by spring winding only, a combined spring lock-out and spring lowering mechanism is used in lieu of rocking cams for resetting.

A special channel and recess structure for the blades enables the first blade to overlap the second during rewind to provide capping during rewind with the rewind mechanism moving the first or openning blade before the second or closing blade.

Basic camera mirror and lens diaphragm actuators are included with the shutter apparatus. These actuators are reset by the shutter rewind mechanism during the latter part of a rewinding sequence. Although not shown, the drive mechanism for the camera mirror is also controlled by rocking cam mechanisms similar to those used for arresting shutter motion and operate in a like manner. Details of the camera and diaphragm mechanisms which are operated by the actuators are not shown herein because of the many variations required due to whether or not the diaphragms are permissive closing or driven closing and whether the lens diaphragm drives are positioned vertically on one side of the mirror box or horizontally below the box.

DETAILED DESCRIPTION

Figure 1:
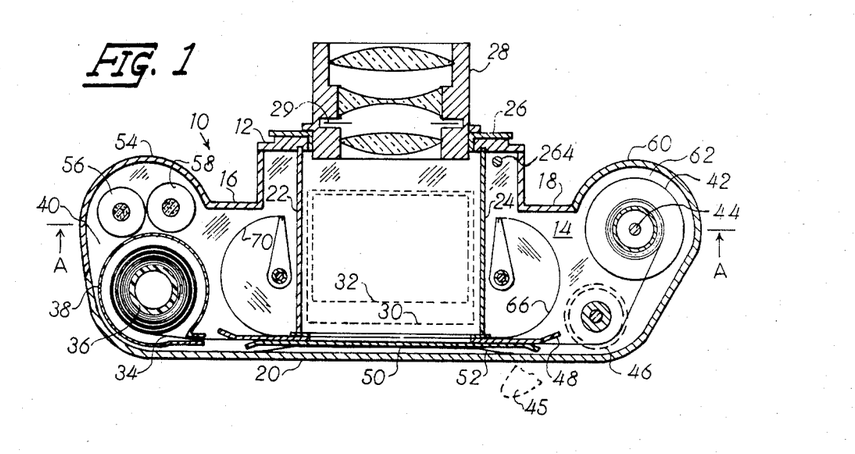
FIG. 1 is a top view cross-section, taken along a horizontal plane, of a single lens reflex camera incorporating the focal plane shutter of this invention.

Referring to FIG. 1 of the drawings, which is a top schematic cross-sectional view of a 35 mm reflex camera with the camera generally designated by the numeral 10. A body structure 12 includes a frame 14, a first front portion 16 which covers the left front of camera 10, a second front portion 18 which covers the right front of the camera 10, a back portion 20 which serves as a back cover, a central portion which may be defined as the space or volume bounded on the sides by mirror box sides 22 and 24, and a flange 26 which supports and retains a lens 28. Inasmuch as the upper portion of the camera 10 is not shown, a mirror 30, in the up position, is shown as a dotted line rectangle. Likewise, the focussing ground glass 32 is also shown as a dotted line rectangle. Lens 28 has an automatic type diaphragm 29 which is spring-biased to close.

Film 34, supplied on spool 36 which is in a cartridge case 38 which, in turn, is retained in the supply chamber 40 in the left hand part of the body structure 12. A film take-up spool 42 is rotated by a shaft 44 which is also used to wind the shutter, to be described later. A sprocket 46 is used to advance the film 34 and is rotated by conventional means connected to shaft 44. Film 34 is supported in the focal plane by an apertured member 48 and held against member 48 by a pressure plate 50 which is acted upon by flat spring 52. Plate 50 is retained on back porion 20 by means not shown. Shaft 44 is rotated by thumb lever 45.

First front portion 16 has an arcuate bulge 54 which forms a grip for the camera user's left hand and extends supply chamber 40 to provide space for batteries 56 and 58. The second front portion 18 has an arcuate bulge 60 which forms a grip for the camera user's right hand and a take-up chamber 62 for the take-up spool 42.

Figure 2:
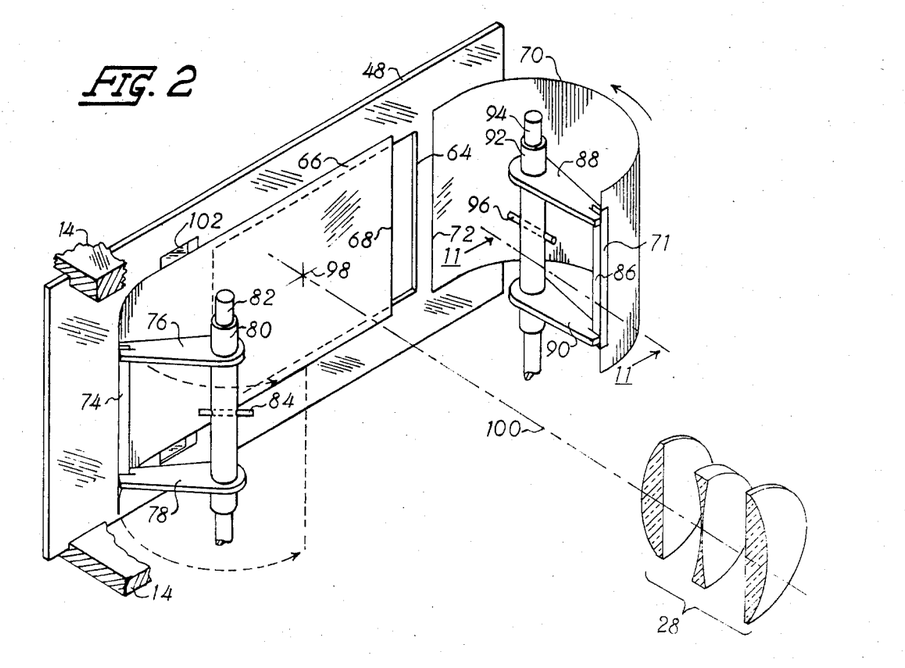
FIG. 2 is an isometric schematic of the focal plane shutter in relation to the exposure aperture and the camera lens.

FIG. 2 shows a part of the focal plane shutter apparatus as incorporated into camera 10. Apertured member 48 is supported and retained by portions of frame 14. The aperture 64 is doffed or uncovered by a first shutter blade 66, here shown with its free end 68 partially uncovering aperture 64. The aperture 64 is donned or covered by a second shutter blade 70 having its free end 72 positioned at a pre-travel distance from aperture 64. The driven end 74 of blade 66 is supported and retained by radially extending arms 76 and 78 which may be integral with, or affixed to, a tubular member 80 which is retained on the first shutter blade drive shaft 82 by pin 84. The driven end 86 of blade 70 is supported and retained by radially extending arms 88 and 90 which are either inetgral with or affixed to a second tubular member 92 which is retained on the second shutter blade drive shaft 94 by pin 96. Drive shafts 82 and 94 rotate sequentially in a counter-clockwise direction, (in FIG. 2), to effect an exposure.

In FIG. 2 a cross 98 indicates where the optical axis 100 of lens 28 intersects the focal plane. After the free end 68 of blade 66 clears the aperture 64 it continues in post-travel until free end 68 springs outward from its path of travel and into a shallow recess 102. While in FIG. 2 the aperture 64 is shown partially uncovered, in FIG. 1 the first blade 66 is shown fully retracted with the aperture 64 fully uncovered, and the second blade 70 in its wound and latched position ready for release.

Figure 3:
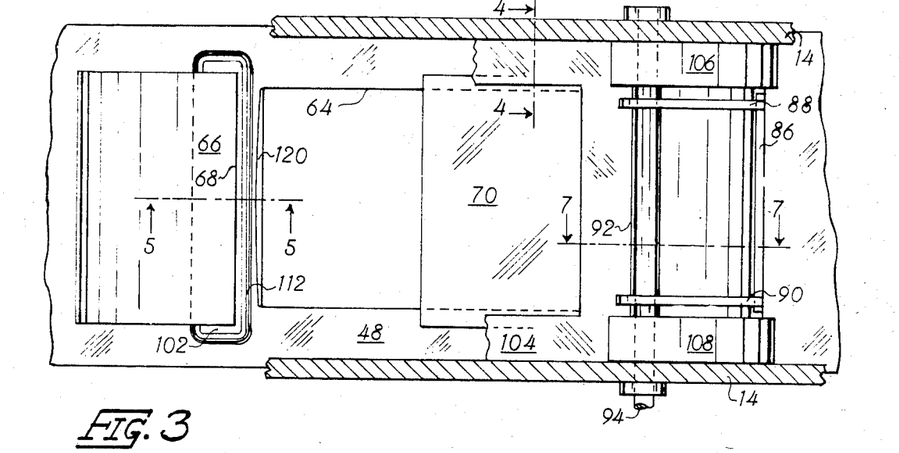
FIG. 3 is a vertical partial plan view of the front of the apertured focal plane defining member and the shutter blades in relation thereto.

FIG. 3 shows the first shutter blade 66 fully retracted with its free end 68 in recess 102 with the distance from free end 68 to the nearest edge of aperture 64 represeting the post travel distance. Second shutter blade 70 is shown partially covering aperture 64. A thin plate 104, spaced from member 48, keeps the shutter blades 66 and 70 in proper position over aperture 64. Top and bottom arcuately channeled members 106 and 108 guide the driven end 86 of blade 70 in a semi-circular path around drive shaft 94. The driven end 74 of the first shutter blade 66 is guided around drive shaft 82 in a like manner in arcuately channeled members which are mirror images of members 106 and 108.

Figures 4, 5, 6, 7, 8:
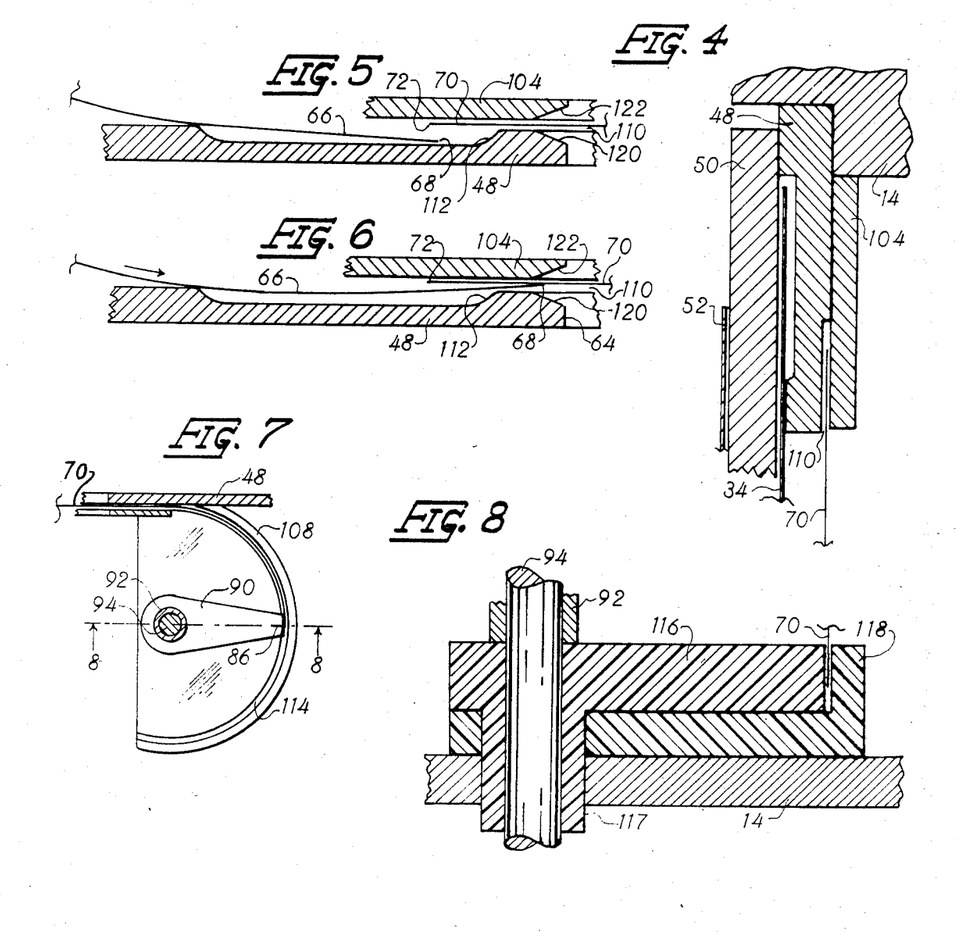
FIG. 4 is a vertical partial cross-sectional view taken along line 4—4 in FIG. 3 showing the top shutter blade guide channel and the film position in the focal plane.
FIG. 5 is a partial cross-section taken along line 5—5 in FIG. 3 showing the recess for receiving the free end of the first shutter blade and guiding it past the free end of the second shutter blade at the beginning of rewind. The free ends of both blades are shown in their respective post-travel positions at the completion of an exposure.
FIG. 6 shows the same cross-section as FIG. 5 but with the free ends of the two shutter blades in overlapped position just after start of a rewind sequence.
FIG. 7 is a partial cross-section view taken along line 7—7 in FIG. 3 showing the top of one of the semi-circular blade guides.
FIG. 8 is a partial vertical cross-section view taken along line 8—8 in FIG. 7 showing a nested construction for the semi-circular shutter blade guides and the integral bearing for the shutter blade drive shaft

FIG. 4 shows, in greater detail, how plate 104 is spaced from member 48 to form a guiding channel 110. This channel, as well as the other shutter blade guiding and directing channels, has a width which desirably does not exceed five times the thickness or shutter blades 66 and 70 which, if they are made of clock spring steel, are about one-thousandth of an inch thick, (0.025 mm). FIG. 4 also shows how the film 34 is guided in a channel between pressure plate 50 and an apertured member 48.

In the detail shown in FIG. 5, free end 68 of shutter blade 66 is shown in the approximate position it assumes at the end of an exposure cycle and out of the straight path followed by free end 72 of the second shutter blade 70. Free end 72 is shown in its final position having completed its post-travel. Radius or sloping edge 112 of recess 102 serves to direct free end 68 out of recess 102 and back into the straight path across aperture 64. Thus in FIG. 6 free end 68 is shown near the edge of aperture 64 and overlapping free end 72 during the first part of a shutter winding sequence and just before winding of drive shaft 94 has begun. It should be noted that, for the sake of clarity, the guide channels shown in FIGS. 4 through 8 are exaggerated in width.

FIG. 7 shows the arcuate channel 114 in channeled member 108 and how this arcuate channel 114 blends into the straight channel between plate 104 and member 48.

FIG. 8 shows how channeled member 108 can be formed of an inner member 116 and an outer member 118 which are nested together and are desirably formed from a plastic material having a very low coefficient of friction. Inner member 116 retains outer member 118 and also serves as a bearing for drive shaft 94, with the bearing extension 117 passing through the bottom of frame 14. The other arcuately channeled members are similarly formed.

Referring back to FIGS. 3 through 7, the aperture 64 in member 48 defines the camera format and, of course, bounds the light path from a lens such as lens 28. The aperture in plate 104 would desirably be the same size as aperture 64 but can be made slightly larger than the equal size shown. Further, to facillitate guiding the free ends 68 and 72 the trailing edges of the apertures in member 48 and plate 104 are chamferred as indicated at 120 and 122 respectively. The opposite or leading edges are equally chamferred.

Figures 9, 10:
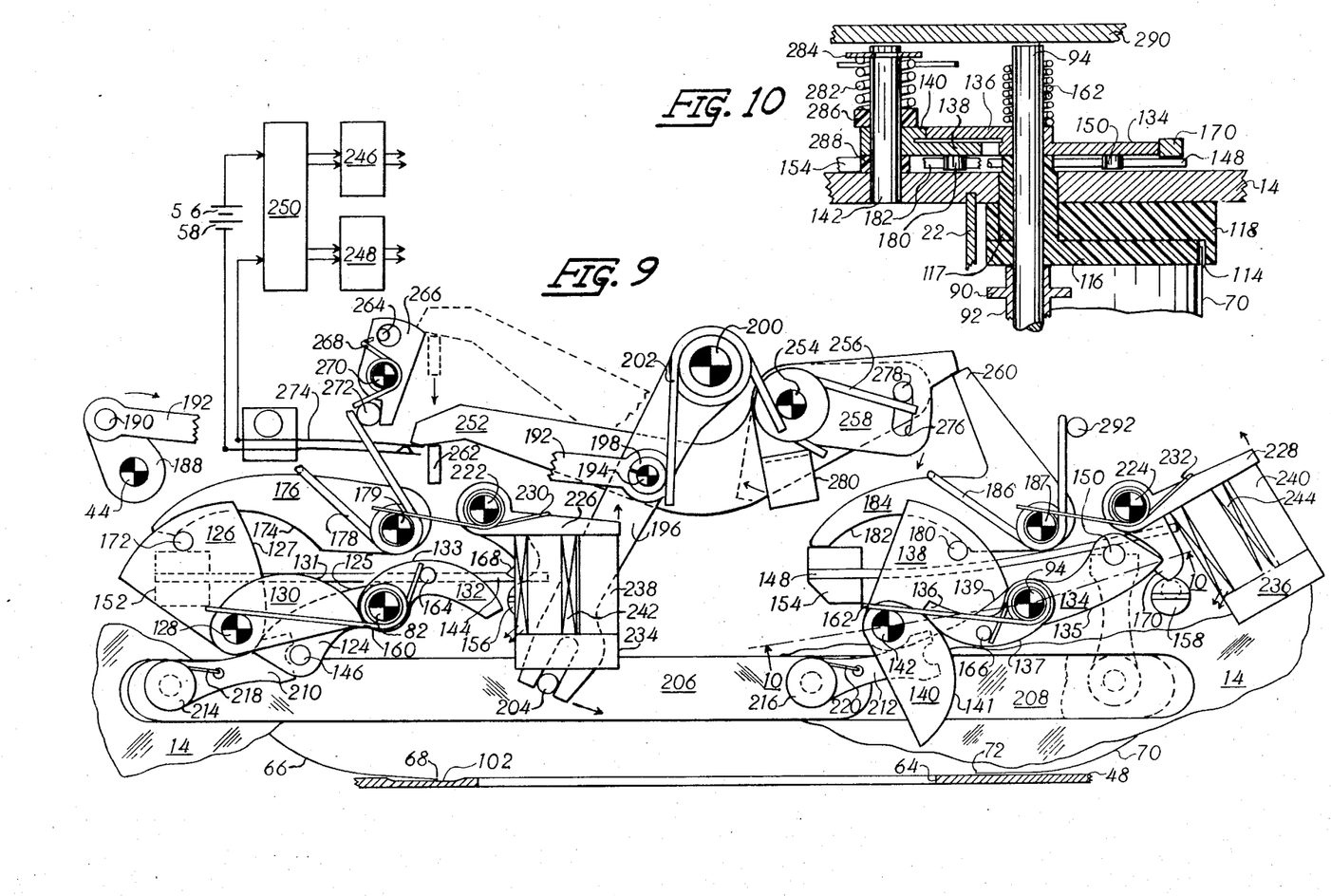
FIG. 9 is a plan view of the focal plane shutter driving and controlling mechanisms as installed on the bottom of the camera body structure.
FIG. 10 is a partial cross-section elevation view taken along line 10—10 in FIG. 9 showing the vertical relationship of one of the rocking cam structures.

Referring now to FIG. 9, which shows the focal plane shutter operating mechanism located in the bottom of the camera 10, the bottom part of frame 14 is shown broken away at the left and right sides of FIG. 9. In FIG. 9, as in FIG. 1, the first shutter blade 66 has completely uncovered the aperture 64 with its associated driving mechanism, to be described, in its stopped or arrested condition ready for winding. The second shutter blade 70 is ready to be driven across aperture 64 with its driving mechanism shown in its wound condition ready for release to complete an exposure sequence.

Drive shafts 82 and 94 rotate at very high velocities during an exposure sequence as the respective shutter blades 66 and 70 respectively uncover and then cover aperture 64. This high velocity is arrested by the use of rocking cam mechanisms having surfaces which roll against each other with little or no sliding. A first driving cam 124 is fitted to shaft 82. A first follower cam 126 rotates on fixed pivot pin 128 and has a cam surface 127 which coacts with cam surface 125 on cam 124. Follower cam 126 is shown in its full over-travel position. A second follower cam 130 is fitted on the first follower cam 126 to form an essentially integral structure. Cam 130 has a cam surface 131 which is oriented in the opposite direction from cam surface 127 and is positioned as shown. A second driving cam 132 is also affixed to drive shaft 82 but has its cam surface 133 oppositely oreiented to cam surface 125 as can be seen in FIG. 9. Cams 124 and 132 also form an essentially integral structure which is press-fitted onto shaft 82. Follower cam 130 and driving cam 132 coact through the 180° rewind rotation of shaft 82 to reset the first follower cam 126. Cams 130 and 132 roll against each other during coacting without sliding.

In a like manner, drive shaft 94 is fitted with a first driving cam 134 having a cam surface 135, and a second driving cam 136 having an oppositely oriented cam surface 137. Also a first follower cam 138, having a cam surface 139, has a second follower cam 140 affixed to it to form an essentially integral structure which rotates on pivot pin 142. As before, the cam surface 141 on cam 140 is oppositely oriented from surface 139.

In the shutter operating mechanism shown in FIG. 9, drive shafts 82 and 94 are each arranged to rotate through 180° and are each driven by two springs. Heavy acceleration spring 144 is engaged by pin 146 pressed into cam 124 and projecting downward therefrom. Likewise, acceleration spring 148 is engaged by pin 150 fitted into cam 134. Acceleration springs 144 and 148 are supported in respective bosses 152 and 154 which are integral with frame 14. Respective eccentrically headed pins 156 and 158 are rotatably affixed into frame 14 and serve to limit the excursion of respective ends of springs 144 and 148 when the respective drive shafts 82 and 94 are released and hence regulate the amount of torque applied to shafts 82 and 94. A relatively light spring 160 is supported on drive shaft 82 and engages a pin 164 fitted into cam 132 and acts to rotate shaft 82 through the full 180° rotation to overcome friction and maintain the initial velocity imparted to shutter blade 66 by spring 144. A second relatively light spring 162 is supported on shaft 94 and engages pin 166 on cam 136 and operates like spring 160. Eccentric pins 156 and 158 have slotted heads and are rotated to adjust the acceleration torque applied to shafts 82 and 94.

When drive shafts 82 and 94 are wound, they are held in latched position, as shown for shaft 94, by respective latches 168 and 170 which, in turn respectively engage the distal ends or first driving cams 124 and 134. When latches 168 and 170 are released in sequence, to be described, the drive shafts 82 and 94 and their respective shutter blades 66 and 70 accelerate very rapidly and considerable kinetic energy is built up in each rotating assembly which must be dissipated very rapidly without shock or vibration as each shutter blade nears the end of its travel.

The dissipation of kinetic energy in stopping each rotating assembly is accomplished by novel stopping assemblies which smoothly engage the driving cams 124 and 134. Referring to the assembly of shaft 82 and blade 66, when free end 68 has almost fully uncovered aperture 64, cam surface 125 engages cam surface 127 and coacts therewith to initiate rotation of cam 126, thus rotating cam 126 counter-clockwise, (in the drawing), as the kinetic energy in the assembly affixed to shaft 82 is transferred thereto. A pin 172 projects downward from cam 126 and engages cam surface 174 on lever 176. As cam 126 rotates, pin 172 slides along cam surface 174 rotating lever 176 in a clockwise direction winding a very stiff spring 178 thus dissipating the transferred kinetic energy in a combination of winding a spring and friction braking. Other friction braking means are also used and will be described later. Cam 138 has a pin 180 projecting downward therefrom which engages cam surface 182 on the edge of lever 184 to drive it in a clockwise direction to wind stiff spring 186 when cam surface 139 is acted upon by cam surface 135 when the leading or free end 72 of blade 70 completes and exposure and reaches the edge of aperture 64 and begins post-travel. Levers 176 and 184 are pivoted on respective fixed pins 179 and 187.

When cam surface 125 starts to coact with cam surface 127, and as the rotation of shaft 82 is arrested by accelerating cam 126 and affixed cam 130, the coacting continues during the post travel of blade 66 by a distance which represents approximately 13½° rotation of shaft 82. During this coacting cam 126 rotates through a much larger angle and can over-travel until ultimately limited by pin 172 striking boss 152 if the kinetic energy is not fully dissipated. Likewise, boss 154 limits rotation of cam 138.

The assembly of cams 126 and 130, as well as cams 138 and 140 are made as heavy as practical and preferably out of sintered powdered metal which has been impregnated with a lubricant. Conversely, cams 124 and 132 on shaft 82 and cams 134 and 136 on shaft 94 are made as light as practical, preferably of a hard aluminum alloy for minimum moment of inertia.

Still referring to FIG. 9, it will be noted that when follower cam 126 is at its limit of over-travel, the distal edge of cam surface 131 rests against the radiussed portion of driving cam 132. When shaft 82 is wound, counterclockwise in the example shown, cam surface 133 coacts with cam surface 131 and rotates the assembly of cams 126 and 130 in a clockwise direction until cam surface 125 engages latch 168, thus resetting follower cam 136. This wound condition is the same as that shown for shaft 94 and its respective related cams.

The winding of camera 10, in FIG. 1, is accomplished by rotating the end of lever 45 counter-clockwise through an angle of about 120°. Lever 45, here only partially shown, is located on top of camera 10 and is connected, by intermediate elements, not shown, to shaft 44. Referring now to FIG. 9, shaft 44 has a crank 188 affixed to its lower end. A pin 190 projects from crank 188 and engages a push link 192, here partially broken away to permit a clear showing of underlying parts, which link also engages a pin 194 which projects from lever 196. Link 192 is retained on pin 194 by a spring collar 198. A similar collar can be used the retain the left end of link 192 on pin 190. Lever 196 rotates on a fixed pivot 200 and is biased to rotate in a clockwise direction by spring 202 which serves to return lever 196 and the associated elements to the home position as shown. Lever 196 has a forked distal end which engages a pin 204 in winding bar 206. Bar 206 slides in a groove 208 in frame 14. Winding links 210 and 212 are retained on bar 206 by headed shoulder pivot pins 214 and 216 respectively, and are biased to rotate counter-clockwise by respective springs 218 and 220.

When lever 196 begins counter-clockwise rotation at the start of a winding sequence, link 210 engages pin 146 and rotates drive shaft 82 counter-clockwise until free end 68 of blade 66 has overlapped free end 72 of blade 70 and reached the aperture 64. At this point link 212 engages pin 150, assuming drive shaft 94 has been previously released to complete an exposure sequence, and then both drive shafts 82 and 94 are rotated thus winding springs 160 and 162 until pins 146 and 150 respectively engage springs 144 and 148. Cam 124 engages latch 168 as link 210 comes on dead center, that is, when its center line is normal to the long axis of bar 206. Lever 196 continues to move bar 206 to the right until cam 134 engages latch 170. At this point lever 45 is released and the associated mechanism is returned to its home position by spring 202. To aid clarity, the right end of bar 206 and link 212 are also shown in dotted line in the position where drive shaft 94 is fully wound and cam 134 has engaged latch 170. In actual practice, both links 210 and 212 push the pins 146 and 150, respectively, until the respective cam surfaces 125 and 135 have cleared latches 168 and 170 by a few thousandths of an inch to insure full engagement of latches 168 and 170. During this winding sequence pins 146 and 150 pick up the respective acceleration springs 144 and 148 at, or preferrably just slightly before the respective free ends 68 and 72 reach the leading or right edge of aperture 64. At approximately this point in the winding sequence, free end 72 is moving faster than free end 68 and, when each shaft, 82 and 94, is fully wound free ends 68 and 72 are in approximate alignment with no overlap and equidistant from the leading edge of aperture 64, this distance representing the pre-travel distance during which acceleration springs 144 and 148 act after being released.

Latches 168 and 170 pivot on fixed pins 222 and 224, respectively, and each have respective soft iron armatures 226 and 228 fastened thereto. Springs 230 and 232 urge the respective armatures 226 and 228 into engagement with respective magnet assemblies 234 and 236 which, in turn, each have a respective permant magnet portion 238 and 240 and a respetive electric coil 242 and 244. Colis 242 and 244 are energised in sequence to generally nullify the holding force of the respective permanent magnet and thus permit latches 168 and 170 to swing counter-clockwise and thus release the respective drive shafts 82 and 94 to effect an exposure. Coils 242 and and 244 are respectively energized in sequence by one-shot pulse circuits 246 and 248 which, in turn, are triggered in sequence by exposure timer 250.

Also shown in FIG. 9 are three levers which are used to control the diaphragm 29 in lens 28 and to raise and lower the mirror 30. The intervening mechanisms between these three levers and the diaphragm 29 and mirror 30 are not shown here inasmuch as their design depends unpon whether lenses fitted to camera 10 have diaphragms which are spring biased to close or to open. Primary mirror and diaphragm actuating lever 252 pivots on fixed pin 254 and is urged in a counter-clockwise direction by spring 256 which also pivots on pin 254 and is partially wound by control lever 258 which is pivoted on pin 254 next to lever 252 and rotates therewith when released by latch lever 260 which is an integral part of lever 184. The third lever 262, of which only the bottom end is shown, pivots on a pin supported by mirror box side 24, and directly controls the mirror 30 and the lens diaphragm 29. This third lever 262 is spring-urged so that it normally occupies a position indicated by the dotted line position shown. Primary lever 252 also normally occupies the dotted line position shown in FIG. 9.

The shutter release sequence is initiated by a push bar 264 which extends down through camera 10 from the top thereof and has a conically pointed end which engages first release latch 266 which, along with its biasing spring 268, is pivoted on fixed pin 270 and has its excursion limited by fixed pin 272. When the user of camera 10 pushes down on bar 264, latch 266 rotates counter-clockwise and releases the end of primary lever 252 which moves to the solid line position shown in FIG. 9. As lever 252 moves the end of lever 262 to the solid line position shown thus effecting raising the mirror 30 and operating diaphragm 29. As primary lever 252 reaches the limit of its travel it closes the normally open switch 274 which completes the electrical circuit from batteries 56 and 58 to timer 250 thus initiating a timing sequence. Timer 250 triggers the one-shot 246 which sends a release pulse to magnet assembly 234 which releases latch 168. After a pre-set interval, timer 250 triggers one-shot 248 which then puts out a pulse to coil 244 and effects release of latch 170 which, in turn, releases cam 134 to complete an exposure. The release sequences continues however, as the rotation of drive shaft 94 is arrested and follower cam 138 rotates counter-clockwise, lever 184 rotates clockwise and its integral latch lever portion 260 releases control lever 258. Lever 258 has an arcuate slot 276. Primary lever 252 has a pin 278 affixed to it which projects through the slot 276 and engages spring 256. Slot 276 limits the excursion of lever 252. Thus when latch lever 260 releases control lever 258, the third lever 262, urged by a spring not shown, moves from the solid to dotted line position and rotates both primary lever 252 and control lever 258 until lever 252 reaches the dotted line position shown, thus completing a release sequence by restoring the mirror 30 and the lens diaphragm 29 to their original positions. When a camera winding sequence nears completion, the bent up or cranked end 280 on control lever 258 engages the end of push link 192 and rotates control lever 258 to the wound and latched position shown and ready for another release sequence of operations.

In the partial cross-section elevation shown in FIG. 10, the vertical relationship of the various parts and sub-assemblies related to drive shaft 94 can be seen. The bearing portion 117 of inner member 116, which is part of channeled member 108, extends through the bottom of frame 14 and supports the first driving cam 134 away from frame 14 to permit the rotation of pin 150 about the axis of shaft 94. The vertical relationship of pin 150 to acceleration spring 148, and of pin 180 to cam surface 182 on lever 184 can be seen. The light carry-through spring 162 is shown in the preferred form as a multi-turn spring. Not shown in FIG. 9 for sake of clarity, but shown here in FIG. 10 is a heavy helical compression spring 282 which is retained on fixed pin 142 by a retaining ring 284 and presses a plastic composition friction washer 286 against the top of second follower cam 140 and forces the bottom of first follower cam 138 against a second plastic composition friction washer 288. Both washers 286 and 268 can, of course, be made of a suitable metal material and each can be made up of a plurality of thin washers. This assembly of spring 282 and washers 286 and 288 are used as a further means of braking the rotation of cams 138 and 140 to aid in the dissipation of the kinetic energy transferred to the cam 138. Similar washers, spring, and retaining ring are used to brake cams 126 and 130 which are pivoted on fixed pin 128. Further, or other, frictional braking means can be just as well applied to the arcuate edges of cams 126 and 138. The choice between this further alternate structure and that shown is mostly determined by structural conveience. The entire shutter operating mechanism on the bottom of frame 14 is protected by camera bottom cover 290 which is considered part of camera body structure 12.

Figure 11:
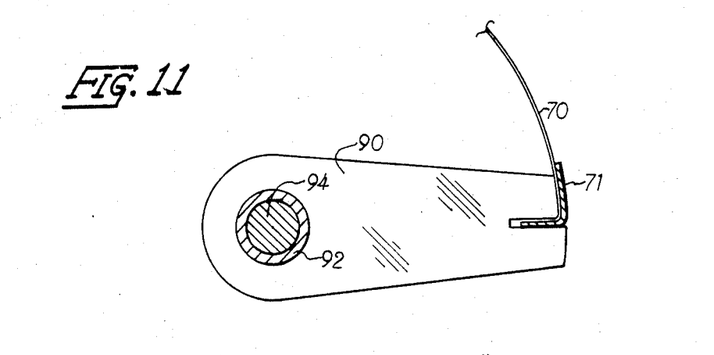
FIG. 11 is a much enlarged partial cross-section view taken along line 11—11 in FIG. 2 showing a re-inforcing angle strip applied to the the driven end of the shutter blade.

FIG. 11 is a downward looking view, much enlarged, to show in detail how an angle piece 71 is used to reinforce the driven end 86 of shutter blade 70 and thus distribute the driving and stopping loads. A similar angle piece is used to reinforce the driven end 74 of blade 66. The reinforcing angle piece is made of clock spring steel and is desirably about three times thicker than blades 66 and 70.

Figure 12:
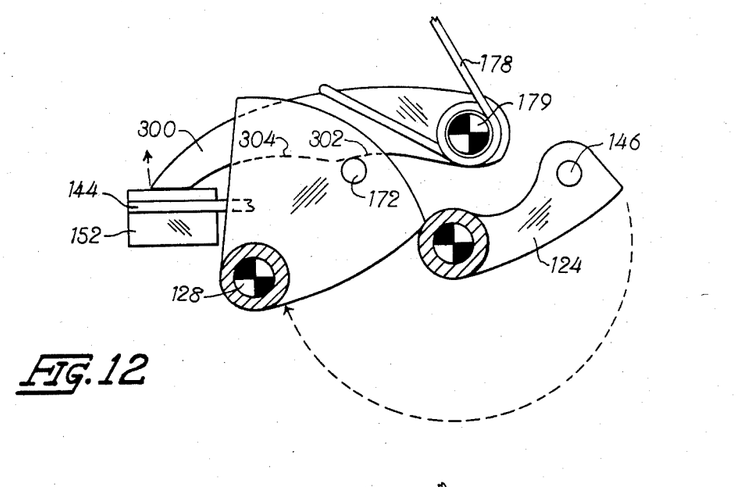
FIG. 12 is an enlarged partial plan view of the left hand portion of FIG. 9 and shows a modified braking lever associated with the stopping mechanism for the doffing shutter blade, and with the first drive cam in latched position.
Figure 13:
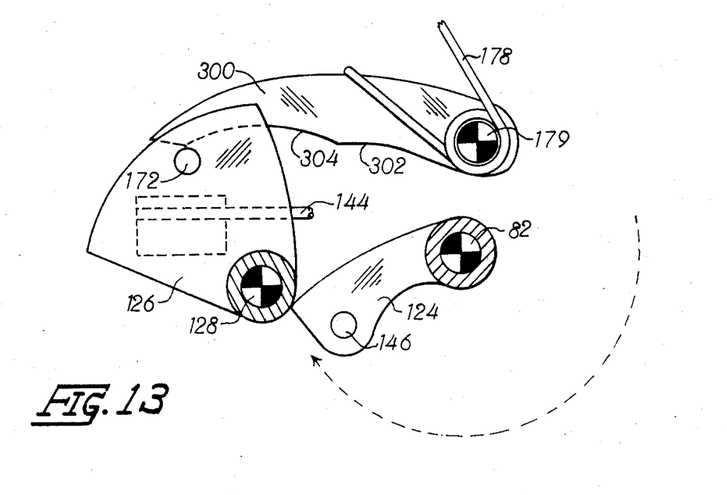
FIG. 13 is similar to FIG. 12 but with the first driving cam in its end position with the doffing shutter blade completely clear of the exposure aperture.

FIGS. 12 and 13 show an improved braking lever 300 which can be used to replace lever 176 shown in FIG. 9. A similar improved lever can also be used to replace lever 184. FIG. 12 shows cam 124 in latched position with cam 126 in its rewound position. Lever 300 has a modified cam surface consisting of a short and essentially radial edge surface 302 and a blended curved surface 304 which is curved to a radius that is approximately equal to the distance from the center of shaft 128 to the outer edge of pin 172. When cam 124 is released and rotates to the point where it begins to rotate cam 126, pin 172 pushes against surface 302 and winds the stiff spring 178 thus applying much greater stopping force to cam 124 during the early part of post-travel of shutter blade 66. As cam 126 rotates further, the addtional kinetic energy imparted thereto is dissipated in the friction braking of pin 172 rubbing against surface 304. The end position of the fully stopped mechanism is shown in FIG. 13 with cam 126 at its maximum limit of rotation which is defined by second follower cam 130 striking the radiussed upper collar portion of cam 124.

Figure 14:
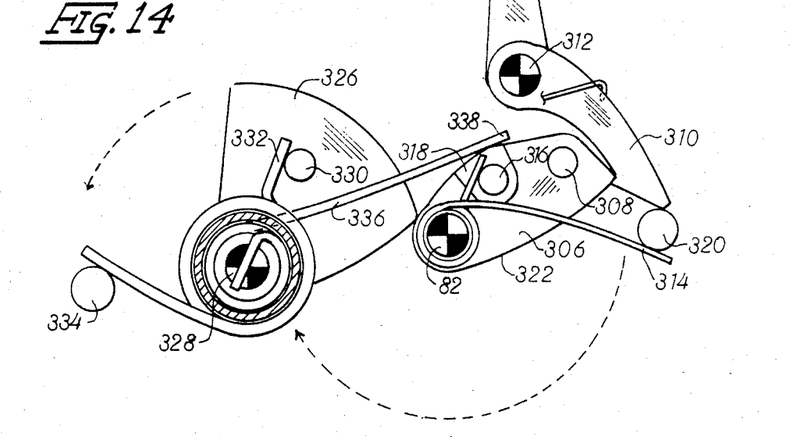
FIG. 14 is similar to FIG. 12 but with the first driving cam replaced with a new cam having a different shape and with the first follower cam fitted with a braking spring and a one-way spring clutch, the first drive cam being in latched position.
Figure 15:
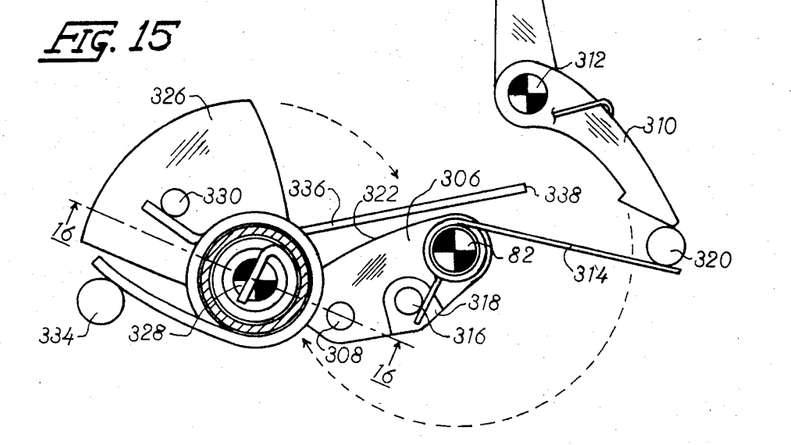
FIG. 15 is similar to FIG. 14 but with the first driving cam in its end position with the doffing shutter blade completely clear of the exposure aperture.
Figure 16:
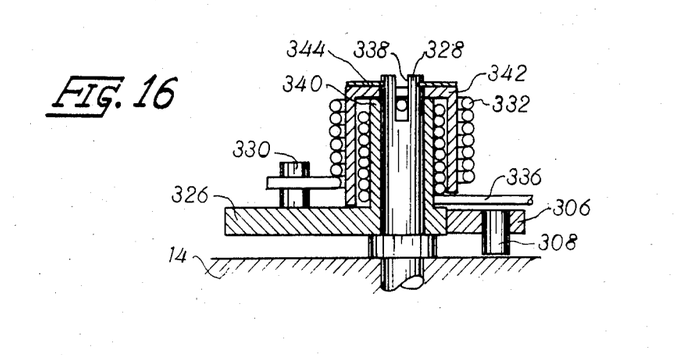
FIG. 16 is a cross-section elevation view taken along line 16—16 in FIG. 15 and shows the nested arrangement of the stopping spring and the one-way spring clutch.

FIGS. 14, 15, and 16 show a different kinetic energy dissipating system wherein levers 176 and 184 are eliminated in cameras where the service life of the braking surfaces may present a problem. This new system can be used to control both the openning and closing shutter blades 66 and 70 and replaces the respective parts shown in FIG. 9. FIG. 14 shows the first driving cam 306 affixed to drive shaft 82 in lieu of cam 124. A pin 308 is used for engaging booster spring 144. A latch 310 is supported on a fixed pivot 312 similar to latch 168. A weak carry through spring 314 is used in a manner similar to spring 160 and is supported on shaft 82 and bears against a projecting pin 316 on boss 318 which projects upward from cam 306. A fixed limit post 320 anchors spring 314 and limits rotation of latch 310. Cam 306 has an operating surface or edge 322 which engages edge 324 on follower cam 326. Cams 306 and 324 comprise a rocking cam pair as before.

Cam 326 pivots on fixed pin 328 which replaces pin 128 shown in FIG. 9. A pin 330 projects upward from cam 326 to engage a stiff spring 332 which urges cam 326 in a clockwise direction. Spring 332 is anchored against a fixed post 334 which also serves as a limit stop for rotation of cam 326. As can be seen from FIGS. 14 and 15, the kinetic energy imparted to shaft 82 and its respective fitted parts after release is dissipated by cam 306 rotating cam 326 which, in turn, transfers the energy to spring 332 by winding it as cam 326 rotates counter-clockwise to its approximate end position as shown in FIG. 15. To prevent rapid return of cam 326 when it stops, a one-way spring clutch 336 is employed. Spring cutch 336 is anchored in a slot 338 in the top of pin 328 as shown in the elevation cross-section in FIG. 16. When cam 306 and drive shaft 82 are rewound, boss 318 engages the free end 338 of clutch spring 336 and rotates it in a counter-clockwise direction to effect release of cam 326 permitting it to return to the position shown in FIG. 14. Inasmuch as the one-way clutch spring 336 is designed to effect gradual release of cam 326, the return rotation of cam 326 does not sharply impact the radiussed portion of cam 322.

The assembly of the stopping structure can be seen in FIG. 16. Cam 326 has an upward extending integral sleeve portion 340 with clutch spring 336 wrapped around it. A floating cup 342 surrounds spring 336 and supports braking spring 332 the assembly is retained on fixed pin 328 by a spring retainer 344. While this stopping or energy dissipating structure does not offer the high initial resistance as that shown in FIGS. 12 and 13, it can be quite effective. It should be noted that a one-way sprag clutch could be applied to the rim of cam 326 as could a one-way pawl, assuming the rim was toothed. In either case release could be effected by a secondary lever which would be engaged by bar 206 during a rewind cycle.

Figures 17, 18, 19, 20:
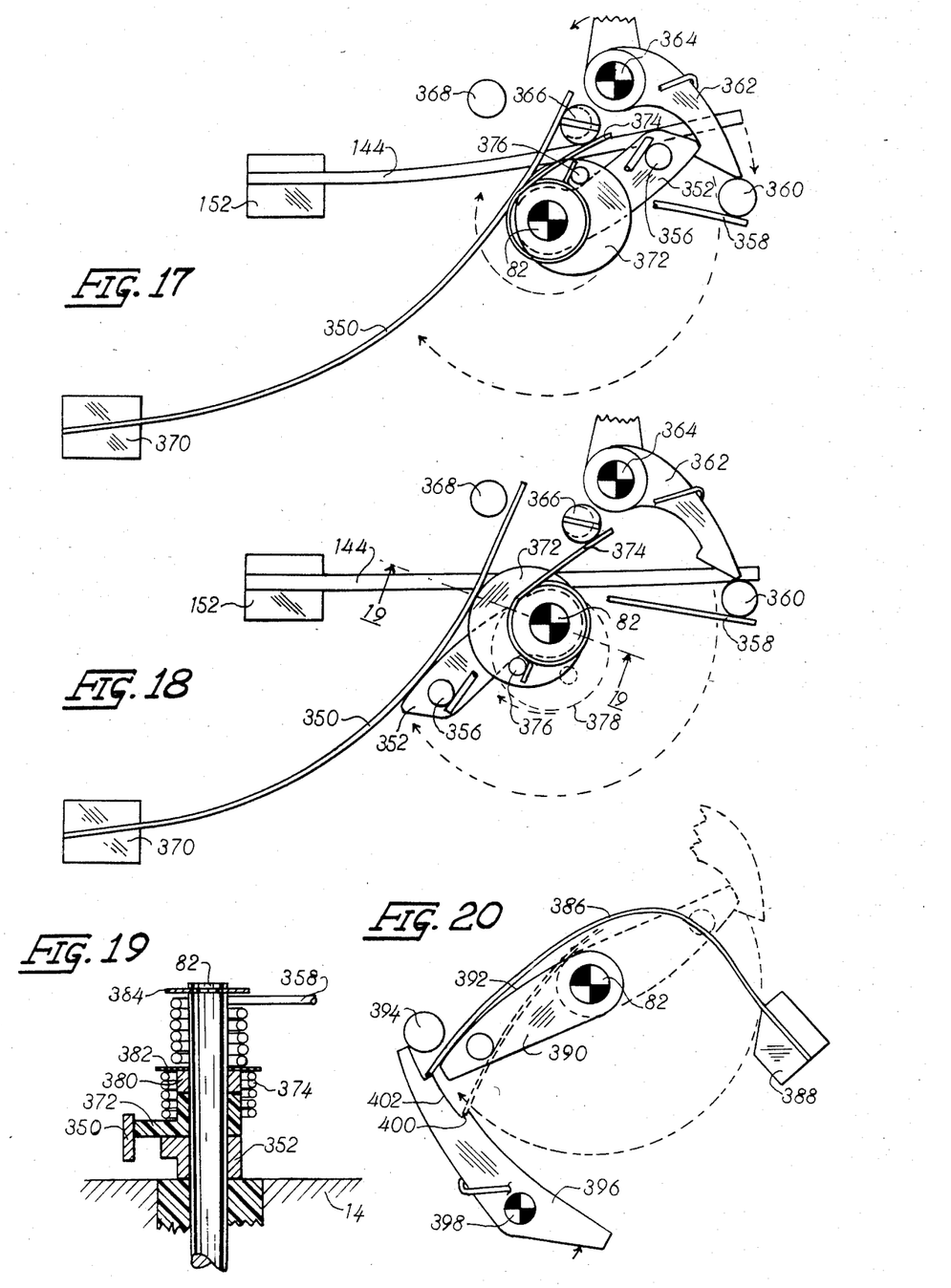
FIG. 17 is an enlarged plan view of the driving and stopping mechanism for the doffing shutter blade in latched position and with the pivoted first follower cam replaced by a cam-configured stopping spring and one type of lock-out structure for preventing stopping spring rebound.
FIG. 18 is similar to FIG. 17 but with the first driving cam in its end position with the stopping spring locked out.
FIG. 19 is a cross-section elevation taken along line 19—19 in FIG. 18 and shows the pile-up of the various springs.
FIG. 20 is an enlarged partial plan view of an alternate stopping spring to that shown in FIGS. 17, 18, and 19, wherein the stopping spring "rotates" in the same hand as the driving cam. This view also illustrates an alternate stopping spring lock-out structure.

In expanding the principle of dissipating most of the kinetic energy by winding a spring as previously shown in FIGS. 9, 12, and 14, further simplification can be acheived if space permits, by replacing the first follower cams 126, 138, or 326 with a cantilevered and cam-configured spring 350 as shown in FIG. 17. Here again, a new driving cam 352 is affixed to drive shaft 82 in lieu of cam 124 and has a rocking cam surface 354 which engages a similar rocking cam surface configured into spring 350 and, when released by latch 362 engages spring 350 near the beginning of post-travel of shutter blade 66 and dissipates the stored kinetic energy by moving spring 350 counter-clockwise.

In FIGS. 17 and 18 driving cam 352 has a pin 356 pressed into it which extends downward to engage acceleration spring 144 and upward to engage the weak carry-through spring 358. Spring 358 is anchored against a limit post 360 which also serves to properly position latch 362 for engaging the tip of cam 352 when cam 352 and shaft 82 are rewound. Two other limit stops are provided to control spring 350. Post 366 is eccentrically mounted so that it can be rotated to just keep spring 350 from touching the assembly mounted on shaft 82. Post 368 limits over-travel of spring 350 and hence rotation of cam 352 beyond the post-travel limit of shutter blade 66.

Cantilevered spring 350 is supported by a boss 370 which can be a part of frame 14 and is pre-stressed when it bears against post 366. When cam 352 rotates to the end of its travel and is stopped by spring 350, rebound is prevented by a special eccentrically supported disk 372 which is preferrably made of plastic and can freely revolve on shaft 82. Disk 372 is urged to rotate clockwise by a spring 374 which bears against a pin 376 which is fixed in disk 372. This pin 376 also projects downward to engage the back side of cam 352 so that when cam 352 is rewound, cam 352 picks up pin 376 and rotates the disk 372 to the position shown in FIG. 17. When cam 352 is released to rapidly move the shutter blade 66, disk 372 follows along being urged by spring 374. When disk 372 reaches the approximate halfway dotted line position 378, its edge picks up spring 350 and its rotation is halted. As cam 352 continues the disk 372 remains at the midway position until cam surface 354 begins to move spring 350. Disk 372 begins to rotate again and follows the excursion of spring 350 until the rotation of cam 352 is fully arrested and thus locks out spring 350 and prevents rapid rebound of spring 350 and hence cam 352. Disk 372, as can be seen in FIG. 18, can rotate clockwise until pin 376 limits rotation by coming against cam 352. When the cam 352 and hence shaft 82 and blade 66 are rewound by the mechanism shown in FIG. 9, cam 352 rotates disk 372 counterclockwise at the same time and thus gradually lowers spring 350 until it is limited by post 366.

FIG. 19, as a cross-section elevation, shows the relationship of the various parts of FIG. 18 at the completion of stopping. Disk 372 is confined on shaft 82 so that it can rotate freely thereabout by a clamp ring 380 pressed on shaft 82. A thin washer 382 separates spring 358 from spring 374 so that there can be no interference. Shaft 82 is modified to accept a spring retainer 384 as shown.

FIG. 20 shows a variation of the cantilevered energy absorbing spring which rotates in the same hand as driving cam 390 which is used on shaft 82 in lieu of cam 124 as shown in FIG. 9. The cantilevered spring 386 is supported by a boss 388 and is pre-shaped to rock against the rocking surface 392 of cam 390 and is, like spring 350 in FIG. 17, pre-loaded by its shaping. Cam 390 and spring 386 are shown in the nominal end position. The latched position of cam 390 is shown dotted line. For sake of clarity, the acceleration spring 144 and the weak carry-through are not shown but would be similar to the springs in the preceding views. A limit post 394 is used to prevent over-excursion of both spring 386 and cam 390. To prevent rapid rebound of spring 386 and cam 390, a light weight spring-loaded lever 396 pivoted on fixed pin 398 follows the excursion of the distal end of spring 386 and snaps in to lock out spring 386 when it reaches its travel limit. Because of the very short time period involved, cam 390 is arranged to be able to over-travel one or two degrees to provide time for lever 396 to move. Lever 396 is also provided with a second notch 400 which serves as a limit stop for spring 386 when cam 390 is in its wound and latched position and prevents the radiussed edge of cam 390 from rubbing against spring 386 during the major portion of rotation of cam 390. To effect reset of spring 386, lever 396 can be cammed out of engagement by a pin or other structure, not shown, which is mounted on, or operated by, bar 206 of FIG. 9. As lever 396 releases spring 386, the tip of spring 386 rubs against surface 402 along the edge of lever 396 to prevent spring 386 from snapping against cam 390. Lever 396 is essentially a pawl or click.

From the foregoing description of the details of this camera invention, it can be seen that a group of specialized structures are combined to make a camera which not only has a new focal plane shutter, but also has the means to control the shutter and other high speed elements to provide a camera which is almost noiseless and vibration free.

Other stopping means can be used with the two shutter blades of this invention but at the expense of noise and vibration. Obviously the motion arresting mechanisms shown and described can be used for other types of focal plane shutters as well as for high speed interlens shutters.

Variations in construction of the motion arresting mechanism of this camera invention can be used to control the mirror and automatic diaphragm operation in a reflex type camera to also secure essentially noise and vibration free operation of these camera elements.

All the various fixed pins and posts shown in FIGS. 9 through 20 can be all press-fitted into the bottom of frame 14. Other methods of winding drive shafts 82 and 94 in sequence can be used to secure the proper overlap. Indeed, shaft 82 can be fully wound before shaft 94 is wound. Bar 206 can be moved by a cable in lieu of push bar 192 and lever 196, with the cable going around guiding pulleys and attached to an arcuate sector on shaft 44. Bar 206 can also have rack teeth along one edge and operated by intermediate gearing from a gear placed on shaft 44. Mechanisms for bulb and time exposures are well-known and hence not shown.

It should be noted, that while the alternate mechanisms as shown in FIGS. 14 through 20 are shown and described in relation to the doffing shutter blade 66 and its drive shaft 82, generally identical structures would also be used for controlling donning blade 70 and its drive shaft 94. Obvious modifications would have to be added to replace latch lever 260 shown in FIG. 9 to secure similar operation.

Further, while the rotation of the shutter driving assemblies are shown as rotating through 180° other operating angles can be used with the appropriate modifications, particularly to the winding structure. While the use of 180° driving structures as shown do indeed take up much space on either side of the mirror box the shutter takes no space in the top and half the bottom space.

Referring back to the discussion of the prior art and the articles on the design of rocking cam mechanisms, it should be pointed out that the portion of the first driving cams 124 and 134, in FIG. 9, which is at a radius from the axis of their respective shafts 82 and 94 can slide or rub against the tips of the respective follower cams 126 and 138 during the considerable pre-travel angle and that the tips of cams 124 and 138 can slide or rub against the radiussed portions of the respective follower cams 126 and 138 during the over travel of the follower cams. These radiussed portions surrounding the drive shafts are, of course, blended into the respective rolling surfaces hence a slight amount of rubbing or sliding can take place at the start or end of coacting engagement. This in no way detracts from the rolling action which takes place during coacting when the driving cam is rapidly moving the respective follower cam after the pre-travel and before the over-travel portions.

The showing of pivoted follower cams and their description herein in no way precludes the substitution of linear moving cams to accomplish the same ends.

The combined shutter blade, blade guiding channels, driving, and motion arresting mechanisms of this shutter make very high exposure speeds without noise or vibration easily obtainable. For example, exposure times of at least 1/4000 second and flash synchronization speeds of 1/250 second can be achieved without the noise and image-degrading vibration of present 35 mm reflex cameras. Further, some simplification of the structures shown is possible, for example, the cantilevered energy absorbing spring can be combined with the bar-like acceleration spring.

I claim:

1. A focal plane shutter apparatus for a camera, which camera has (a) a focal plane, (b) means for supporting a lens to form an image in the focal plane, (c) a generally flat member adjacent the focal plane having an exposure aperture therein which bounds the image-forming light path from a supported lens to a sensitive material supported at the focal plane, and further having a front surface facing the lens supporting means, and (d) a body structure which includes frame means for supporting said apparatus, said lens supporting means, and said member; comprising:

first and second flexible shutter blades for respectively uncovering and covering said aperture in sequence to make an exposure, each blade having a driven end and a free end opposite thereto for traversing a pre-travel distance, said aperture, and then a post-travel distance, respective first and second shutter blade driving means bilaterally disposed in front of said member and adjacent the respective sides of said light path and supported by said frame means for limited rotation relative thereto, respective shutter blade retaining means affixed on each of said driving means and extending radially therefrom, each retaining means having the driven end of the respective shutter blade rigidly affixed to the distal end thereof, channel means for guiding and directing each of said blades in an arcuate path around their respective driving means and thence in a straight path across said aperture, said arcuate path having a radius generally equal to that of the distal ends of said blade retaining means, respective spring means for acting upon each of said driving means to first accelerate the respective shutter blade generally during said pre-travel of the free end of that blade, and then at least maintain the imparted velocity while the free end of that blade is traversing said aperture when making an exposure, respective motion arresting means cooperating with each of said driving means to decelerate the respective shutter blade generally during said post-travel of the free end of that blade and smoothly stop all motion of the driving means and said respective blade, winding means, operable after an exposure, for resetting said driving means and said spring means, and respective latching and releasing means for each of said driving means.

2. An apparatus as defined in claim 1 in which each of said respective motion arresting means comprises:
  a first rocking cam pair having a first driving cam affixed to the respective driving member and a first follower cam supported adjacent thereto,
  said first rocking cam pair arranged to coact by generally rolling against each other during the deceleration and stopping of said respective driving member,
  an energy absorbing spring arranged to be deflected by said first follower cam during at least part of said coacting and hence motion arresting, and
  deflecting means associated with said second follower cam for deflecting said energy absorbing spring.

3. An apparatus as defined in claim 2 in which each of said respective motion arresting means further comprises:
  lock-out means for preventing rebound of said energy absorbing spring at the completion of said motion arresting, and
  lock-out releasing means actuated during winding of the respective driving means for effecting return of said energy absorbing spring.

4. An apparatus as defined in claim 3 wherein said lock-out means comprises a one-way clutch means.

5. An apparatus as defined in claim 2 in which each of said respective motion arresting means further comprises:
  friction braking means which cooperates with said first follower cam during at least part of said coacting and hence motion arresting.

6. An apparatus as defined in claim 5 in which each of said motion arresting means further comprises:
  a second rocking cam pair having a second driving cam affixed to the respective driving member and oppositely oriented to said first driving cam, and a second follower cam affixed to said first follower cam and oppositely oriented thereto, and
  said second rocking cam pair coact by rolling against each other during winding of the driving means to effect reset of said first follower cam.

7. An apparatus as defined in claim 5 wherein said friction braking means comprises said deflecting means.

8. An apparatus as defined in claim 1 in which:
said pre-travel and said post-travel distances are substantially equal to, or more than, one-twelfth the traversed length of said aperture.

9. An apparatus as defined in claim 1 in which:
said shutter blades have top and bottom portions extending substantially all of the length thereof,
said channel means includes top and bottom channels for guiding the top and bottom portions of said blades, and said top and bottom channels have a width not substantially greater than five times the thickness of said shutter blades.

10. An apparatus as defined in claim 1 in which said respective spring means each comprise:
  a bar-like acceleration spring, having an end supported by said frame, for engaging and driving the respective driving means and respective shutter blade generally throughout said pre-travel distance, and
  a carry-through spring supported for applying force to said respective driving means throughout its rotation when making an exposure.

11. An apparatus as defined in claim 1 in which:
said winding means comprises means for sequentially engaging said first and second driving means to effect overlap of the free end of said second blade by the free end of said first blade before beginning to wind the second driving means and then essentially simultaneously winding both of the driving means to a point in the rotation thereof where each is engaged by its respective latch means, and
said winding means further comprises spring means for the resetting thereof after completion of a winding sequence.

12. An apparatus as defined in claim 11 in which:
said first and second shutter blades are each guided in the same channel across said aperture,
said member has a shallow recess transversely located in the front surface thereof, generally adjacent to said first driving means and having one edge thereof closely adjacent said aperture, for receiving the free end of said first blade during the post-travel thereof and supporting said free end at one side of said straight path, and
said one edge of said recess comprises a sloping edge for directing said free end of said first blade out of the recess, past the free end of said second blade, and back into said straight path to secure said overlap during the beginning of a winding sequence.

13. An apparatus as defined in claim 1 in which:
said channel means comprises a thin flat plate supported on said front surface of said member, equally apertured, and spaced therefrom to form channels for guiding the free ends of said blades across said aperture.

14. A focal plane shutter apparatus for a camera, which camera has (a) a focal plane, (b) means for supporting a lens to form an image in the focal plane, (c) a generally flat member adjacent the focal plane having an exposure aperture therein which bounds the image-forming light path from a supported lens to a sensitive material supported at the focal plane, and further having a front surface facing the lens supporting means, and (d) a body structure which includes a frame means for supporting said apparatus, said lens supporting means, and said member; comprising:
  first and second flexible shutter blades for respectively uncovering and covering said aperture in sequence to make an exposure, each blade having a driven end and a free end opposite thereto for traversing a pre-travel distance, said aperture, and then a post-travel distance, respective first and second shutter blade driving means bi-laterally disposed in front of said member and adjacent the respective sides of said light path and supported by said frame means for limited rotation relative thereto, respective shutter blade retaining means affixed on each of said driving means and extending radially therefrom, each retaining means having means on the distal ends thereof for retaining the respective driven ends of said blades, channel means for guiding and directing each of said blades in an arcuate path around their respective driving means and thence in a straight path across said aperture, which channel means is common to both blades for the length of said straight path plus said pre-travel and post-travel distances at each end of said path, respective spring means which act upon said driving means for driving said shutter blades during an exposure, winding means, operable after an exposure, for sequentially engaging said first and second driving means to effect overlap of the free end of said second blade by the free end of said first blade before beginning to wind the second driving means and then essentially simultaneously winding both of said driving means, and respective latching and releasing means for each of said driving means for holding the driving means in a wound position at the completion of a winding sequence, said member has a shallow recess transversely located in the front surface thereof, generally adjacent to said first driving means and having one edge thereof closely adjacent said aperture, for receiving the free end of said first blade during the post-travel thereof and supporting said free end at one side of said straight path, and said one edge of said recess comprises a sloping edge for directing the free end of said first blade out of the recess, past the free end of said second blade, and back into said straight path to secure said overlap during the beginning of a winding sequence.

15. In a camera having a structure which is urged to move rapidly from a first position to a second position, motion arresting means which cooperates with said structure to decelerate the structure when it nears the second position and bring it to a smooth stop thereat; comprising:

a first rocking cam pair for effecting transfer and dissipation of the kinetic energy built up in said structure as it moves from said first to said second position, said first rocking cam pair further comprising a first driving cam affixed to said structure and a first follower cam supported adjacent thereto, which cams roll against each other during coacting, and energy absorbing spring means, supported for cooperation with said first follower cam and arranged to be substantially deflected thereby and thus absorb at least part of the kinetic energy transferred to said first follower cam.

16. A camera as defined in claim 15 wherein said structure comprises means for operating a shutter.

17. A camera as defined in claim 15 in which:

said energy absorbing spring means further comprises (a) a spring winding cam supported adjacent said first follower cam, and (b) an energy absorbing spring arranged to be wound by said winding, and means associated with said first follower cam for engaging said spring winding cam.

18. A camera as further defined in claim 19 in which:

said spring winding cam has a short active portion with a high rise for winding said energy absorbing spring, and a long active portion having little or no rise for dissipating the balance of kinetic energy transferred to said first follower cam in friction braking.

19. A camera as further defined in claim 18 further comprising:

a second rocking cam pair which roll against each other for effecting reset of said first follower cam when said structure is moved from said second position to said first position, said second rocking cam pair comprising; (a) a second driving cam affixed to said structure and oppositely oriented to said first driving cam, and (b) a second follower cam affixed to said first follower cam and oppositely oriented thereto.

20. A camera as defined in claim 15, further comprising:

lock-out means for preventing rebound of said energy absorbing spring at completion of energy absorbing, and lock-out releasing means for releasing the lock-out means.

21. A camera as further defined in claim 20 in which:

said lock-out means is a one-way clutch, and said lock-out releasing means comprises means associated with said structure.

22. A camera as defined in claim 21 wherein said one-way lutch is a releasable spring clutch.

23. A camera as defined in claim 20 wherein said energy absorbing spring means comprises said first follower cam.

24. A camera as defined in claim 23 in which said lock-out means comprises:

a lock-out cam supported by said structure for limited motion relative thereto, and a biasing spring for urging said lock-out cam into engagement with said energy absorbing spring means as said first driving cam deflects the energy absorbing spring.

25. A camera as defined in claim 20 in which said energy absorbing spring comprises:

a cantilevered spring supported adjacent said structure, and said cantilevered spring comprises said first follower cam and has a portion which coacts with said first driving cam by rocking thereagainst during said motion arresting.

26. A camera as defined in claim 25 in which said lock-out means comprises a pawl.

27. A camera as defined in claim 25 in which:

said lock-out means comprises; (a) a lock-out cam supported by said structure for limited motion relative thereto, (b) a biasing spring for urging said lock-out cam into engagement with said cantilevered spring during motion arresting, and said lock-out releasing means comprises means for engaging said lock-out cam when said structure is moved from said second position to said first position whereby the lock-out cam is moved to permit said cantilevered spring to gradually return to the position which it occupies when said structure is at said first position.

28. A focal plane shutter apparatus for a camera, which camera has (a) a focal plane, (b) means for supporting a lens to form an image in the focal plane, (c) a generally flat member adjacent the focal plane having an exposure aperture therein which bounds the image-forming light path from a supported lens to a sensitive material supported at the focal plane, and (d) a body structure which includes frame means for supporting said apparatus, said lens supporting means, and said member; comprising:

first and second shutter blades for respectively uncovering and covering said aperture in sequence to make an exposure, each blade having a free end for traversing the aperture including pre-travel and post travel distances relative to the aperture and a driven end opposite the free end, respective first and second spring-urged shutter blade driving means bi-laterally disposed in front of said member and adjacent the respective sides of said light path and supported by said frame means for limited rotation relative thereto to drive the respective shutter blades in respective arcuate paths around each driving means and across said aperture, winding means for said driving means, respective latching means and releasing means for each driving means, guiding means associated with said flat member to form a single straight channel, tangent to said arcuate paths, for closely confining said shutter blades therein during said pre-travel, across said aperture, and during said post-travel, a shallow recess transversely located in said front surface adjacent said aperture, for receiving the free end of the first blade during the post-travel thereof and supporting that free end at one side of said straight channel and out of the path of the free end of the second blade, and said recess having a slope which directs the free end of the first blade out of the recess and back into said straight channel during a winding sequence.

29. An apparatus as defined in claim 28 in which;

said winding means comprises means for sequentially engaging said first and second driving means to effect overlap of the free end of the second blade by the free end of said first blade before beginning to wind the second driving means and then essentially simultaneously winding both of the driving means to a point in the rotation thereof where each is engaged by its respective latching means.

30. An apparatus as defined in claim 29 in which said winding means further comprises spring means for the resetting thereof after completion of a winding sequence.

31. An apparatus as defined in claim 29, comprising:

first and second acceleration springs for applying torque to respective first and second driving means during said pre-travel of each of said blades, and first and second cary-through springs for applying sufficient torque to respective first and second driving means for at least maintaining the velocity imparted to said blades by said acceleration springs until said blades begin their post-travel.

32. An apparatus as defined in claim 31 in which;

said frame means has respective support means integral therewith for retaining each of said acceleration springs, said acceleration springs are each a bar-like spring retained at one end by the respective support means, and said frame means has adjustable means retained thereby for limiting the movement of each of the other ends of said bar-like springs.

33. A focal plane shutter apparatus for a camera, which camera has (a) a focal plane, (b) means for supporting a lens to form an image in the focal plane, (c) a generally flat member adjacent the focal plane having an exposure aperture therein which bounds the image-forming light path from a supported lens to a sensitive material supported at the focal plane, and further having a front surface facing the lens supportng means, and (d) a body structure which includes frame means for supporting said apparatus, said lens supporting means, and said member; comprising:

first and second flexible shutter blades for respectively uncovering and covering said aperture in sequence to make an exposure, each blade having a free end for traversing said aperture as well as pre-travel and post-travel distances relative to the aperture, and a driven end opposite the free end, first and second spring-urged shutter blade driving means, for driving said first and second shutter blades respectively, and bilaterally disposed in front of said member and adjacent the respective sides of said light path and supported by said frame means for limited rotation relative thereto, each said driving means having shutter blade retaining means extending radially from the driving means, each retaining means having means on the distal ends thereof for retaining and supporting the driven end of its complementary shutter blade, channel means for guiding and directing each said blade in an arcuate path around the driving means for that blade and thence in a straight path tangent to the respective arcuate paths across said aperture, said arcuate paths having a radius generally equal to that of the distal ends of said blade retaining means, winding means for said driving means, respective latching and releasing means for each of said driving means, first and second acceleration springs for applying torque to respective first and second driving means when traversing respective pre-travel distances, and first and second carry-through springs for applying sufficient torque to respective first and second driving means for at least maintaining the velocity imparted to said blades by said acceleration springs while the free end of each blade is traversing said aperture.

34. An apparatus as defined in claim 33 in which:

said frame means has respective support means integral therewith for retaining each of said acceleration springs, said acceleration springs are each a bar-like spring retained at one end by the respective support means, and said frame means has respective eccentric means rotatably retained thereby for limiting the movement of each of the other ends of said bar-like springs.

35. An apparatus as defined in claim 33 in which:

said winding means comprises means for sequentially engaging said first and second driving means to effect overlap of the free end of said second blade by the free end of said first blade before beginning to wind the second driving means and then essentially simultaneously winding both of the driving means to a point in the rotation thereof where each is engaged by its respective latch means, and said winding means further comprises spring means for the resetting thereof after completion of a winding sequence.

36. An apparatus as defined in claim 35 in which:

each of said blades moving a post-travel distance after traversing said aperture in the course of effecting an exposure, said first and second shutter blades are each guided in the saime channel across said aperture, said member has a shallow recess transversely located in the front surface thereof, generally adjacent to said first driving means and having one edge thereof closely adjacent said aperture, for receiving the free end of said first blade during the post-travel thereof and supporting said free end at one side of said straight path, and said one edge of said recess comprises a sloping edge for directing said free end of said first blade out of the recess, past the free end of said second blade, and back into said straight path to secure said overlap during the beginning of a winding sequence.

37. An apparatus as defined in claim 33 in which:

said channel means comprise channels which have a width not substantially greater than five times the thickness of said shutter blades.

38. An apparatus as defined in claim 33 in which:

said channel means comprises a thin flat plate supported on said front surface of said member, equally apertured, and spaced therefrom to form channels for guiding said blades across said aperture.

39. An apparatus as defined in claim 33 further comprising:

each blade moving a post-travel distance after traversing said aperture in the course of effecting an exposure, first and second pairs of rocking cams which coact by generally rolling against each other, each pair comprising a first driving cam and a first follower cam, for smoothly arresting rotation of the respective first and second driving means, essentially during said post-travel of the respective shutter blade, by using the first driving cams to transfer the kinetic energy built up in the driving means and shutter blade to the respective first follower cams, respective energy dissipating means for dissipating the kinetic energy transferred to each of said first follower cams, and means for resetting the respective first follower cams during a winding sequence.

40. An apparatus as defined in claim 39 in which;

said energy dissipating means each comprise friction braking means.

41. An apparatus as defined in claim 39, in which;

said energy dissipating means each comprise means for winding a spring.

42. An apparatus as defined in claim 39 in which;

each of said first follower cams is supported for over-travel and continuing cooperation with the respective energy dissipating means after the rotation of the respective driving means is arrested.

43. A shutter winding mechanism for a camera, which camera has (a) a frame, (b) a focal plane, (c) a member supported by said frame for defining the focal plane and having an exposure aperture therein, (d) a focal plane shutter having first and second spring-driven curtains for respectively uncovering and then covering said aperture in sequence to make an exposure when released from respective wound positions, and (e) means for latching each spring-driven curtain in its wound position and releasing each curtain therefrom; comprising:

means for operating said winding mechanism, winding means comprising part of said mechanism for (a) beginning winding of said first spring-driven curtain to effect overlap of a portion of said second spring-driven curtain by a portion of the first curtain, (b) then essentially simultaneously winding both of said curtains until each reaches its respective wound position and is latched thereat, and (c) winding each of said spring-driven curtains in substantially diminishing increments of motion thereto when each curtain approaches its respective wound position whereat said increments diminish to zero, said winding means comprises link means for applying winding force to each of said spring-driven curains, and said diminishing increments are secured by said link means coming on a dead center position, said winding means further comprises a sliding bar supported by said frame, said link means are respective link means for each of said spring-driven curtains, and said respective link means are each pivoted at one end thereof on said sliding bar.

* * * * *